(12) United States Patent
Garcia et al.

(10) Patent No.: US 8,292,400 B2
(45) Date of Patent: Oct. 23, 2012

(54) VIRTUAL PEN CALIBRATION

(75) Inventors: Luis Garcia Garcia, Barcelona (ES); Sergio Puigardeu, Barcelona (ES); Marc Serra Vall, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 12/838,812

(22) Filed: Jul. 19, 2010

(65) Prior Publication Data

US 2012/0013674 A1 Jan. 19, 2012

(51) Int. Cl.
*B41J 29/393* (2006.01)
*B41J 29/38* (2006.01)
*B41J 2/155* (2006.01)
*B41J 2/14* (2006.01)

(52) U.S. Cl. .......... 347/19; 347/13; 347/42; 347/49

(58) Field of Classification Search .................. None
See application file for complete search history.

(56) References Cited

U.S. PATENT DOCUMENTS

| 6,086,181 | A | 7/2000 | Majette et al. |
| 6,582,052 | B2 | 6/2003 | Sarmast et al. |
| 7,118,188 | B2 | 10/2006 | Vilanova et al. |
| 7,547,084 | B2 | 6/2009 | Wade et al. |
| 2006/0066655 | A1 | 3/2006 | Richard et al. |

FOREIGN PATENT DOCUMENTS

EP 0997281 B1 12/2002

*Primary Examiner* — Stephen Meier
*Assistant Examiner* — Tracey McMillion (57) ABSTRACT

A method for pen drop weight calibration includes altering an image prior to printing based on the difference in printing performance of a first pen and a second pen to produce altered image data, the first pen and the second pen being disposed in the same printer. The altered image data is then printed with the printer.

20 Claims, 10 Drawing Sheets

| Pen A Calibration | |
|---|---|
| cyan | reference |
| magenta | reference |
| yellow | reference |
| black | reference |

| Pen B Calibration | |
|---|---|
| cyan | y = Ax + B |
| magenta | y = Cx + D |
| yellow | y = Ex + F |
| black | y = Gx + H |

*Fig. 10A*

| Pen A Calibration | |
|---|---|
| cyan | y = Ix + J |
| magenta | y = Kx + L |
| yellow | y = Mx + N |
| black | y = Ox + P |

| Pen B Calibration | |
|---|---|
| cyan | y = Ax + B |
| magenta | y = Cx + D |
| yellow | y = Ex + F |
| black | y = Gx + H |

VIRTUAL PEN CALIBRATION

BACKGROUND

In the printing field, the quality of printed images and the time the printer uses to create the images are often related. Higher quality printed images can take significantly longer to print than lower or draft quality prints. One method of increasing the speed of the printer while maintaining high print quality is to increase the carriage speed. However, there are limits to how fast the carriage can move. Another technique is to increase the size of the pen which deposits ink onto the substrate so that the width of the printing swath increases. However, creating larger pens can be cost prohibitive.

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In the printing field, the quality of the printed image and the time the printer uses to create the image are often related. Higher quality printed images can take significantly longer to print than lower or draft quality prints. One method of increasing the speed of the printer while maintaining print quality is to increase the carriage speed. However, there are limits to how fast the carriage can move. Another technique is to increase the size of pen which deposits ink onto the substrate so that the width of the printing swath increases. However, designing and manufacturing larger pens can be cost prohibitive.

As described below, one illustrative method for increasing thermal ink jet printing speed while maintaining or increasing image quality is to use a printhead with multiple staggered pens. This configuration of multiple staggered pens is called a "virtual pen." This virtual pen covers a larger area and can dispense more ink, but can have image quality issues. There are normal manufacturing variations between the multiple pens which make up the virtual pen. This can result in one pen printing a swath that is slightly different than another pen on the printhead. This difference between the swaths is called banding. Banding is particularly noticeable when printing an image with relatively uniform areas. Banding can be corrected using multi-pass printing, but this slows down the printing process. The method described below provides a calibration between pens which is applied to the image to be printed which reduces or eliminates banding without requiring multi-pass printing.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Figure 1:
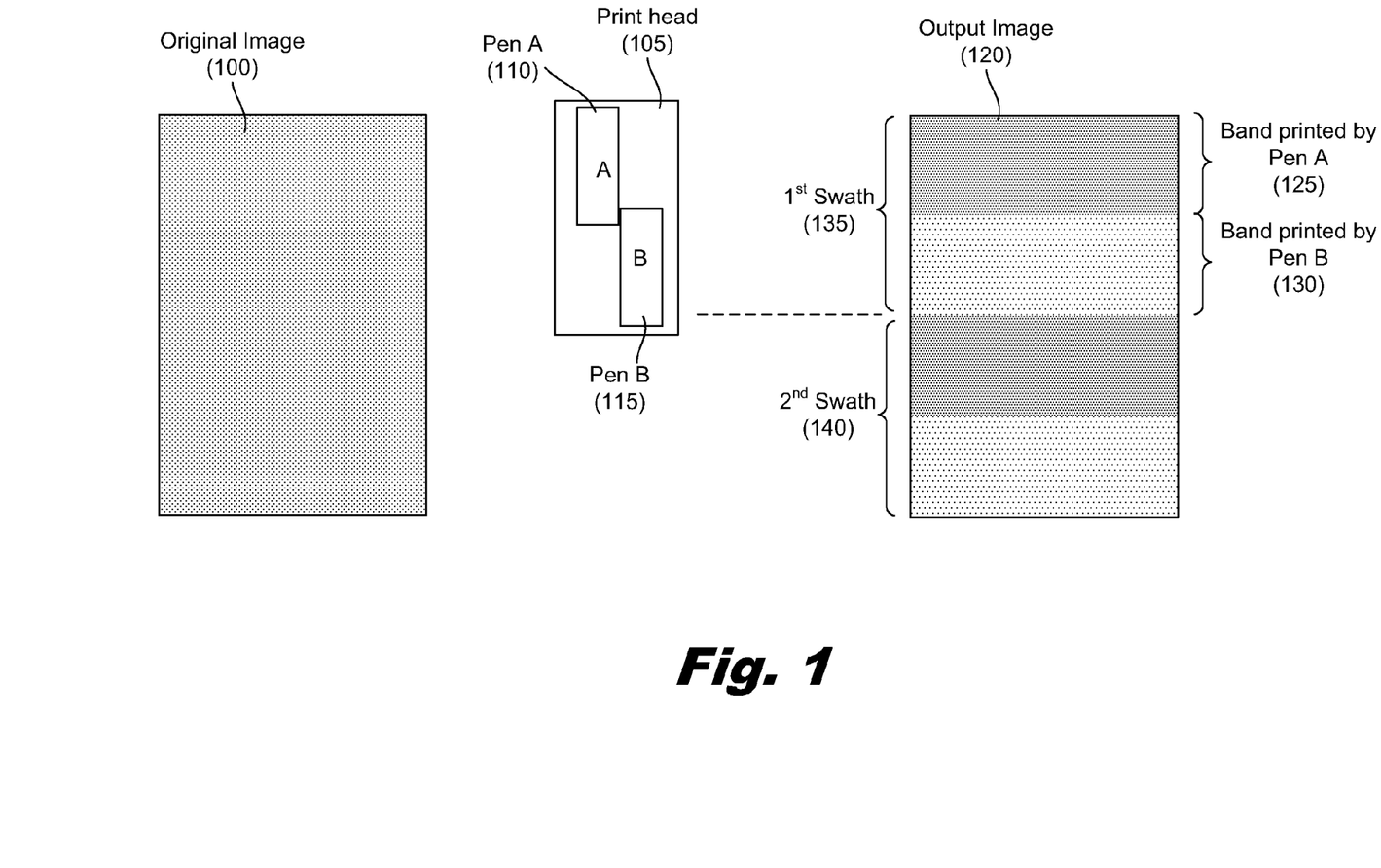
FIG. 1 is a diagram of a printhead with staggered pens, according to one embodiment of principles described herein.

FIG. 1 is a diagram of a printhead (105) with staggered pens (110, 115). In large format thermal inkjet printing, the printhead is typically moved across the page by a carriage mechanism. As the carriage moves, the pens distribute tiny droplets of ink over the surface of the substrate. These droplets of ink form the image on the substrate. In order to increase the throughput of the printing system, the size of the printhead can be increased. In this example, the printhead includes two staggered pens—Pen A (110) and Pen B (115). By including two pens in the printhead, the printhead can dispense twice as much ink as a printhead with only one pen. Additionally, the pens can cover a swath which is almost twice as wide as a single pen. This could result in much higher printing throughput.

However, there is an image quality problem for one-pass printing with a printhead (105) that has multiple pens. This image quality issue arises because of variations in drop weights between Pen A (110) and Pen B (115). In this example, Pen A (110) has a larger drop weight than Pen B (115). Consequently, for the same input, the band printed by Pen A (125) is darker than the bank printed by Pen B (130). Consequently, the output image of (120) takes on a banded appearance which is not evident in the original image (100). In one-pass printing, the printhead (105) passes over each portion of the substrate only once. Each pass over the substrate lays down a swath of ink. In the first swath (135) there are two bands evident. The first band printed by Pen A (110) which is darker, and the second band (130) printed by Pen B (115) which is lighter. Similarly, in the second swath (140) there is a dark band printed by Pen A (110) and a light band printed by Pen B (115). For some images, this variation in density may not be an issue. However, for images having a relatively uniform color distribution over a large area, this banding can become a significant image quality issue.

Although the principles described below are illustrated using a moving carriage with only two pens, the principles are equally applicable to printers which use a larger number of pens. For example, wide-array inkjet printheads typically deposit ink across the entire width of a substrate as it is fed through the printer. Because the wide-array printheads are as wide as the substrate, there is no need for translation of the printhead. The printhead may contain 10 or more individual pens. The pens in a wide-array printhead may have performance differences which are similar to those described above, resulting in banding and other image quality issues. Banding artifacts produced by a wide array inkjet printhead can be addressed using the principles and techniques described below.

Figure 2:
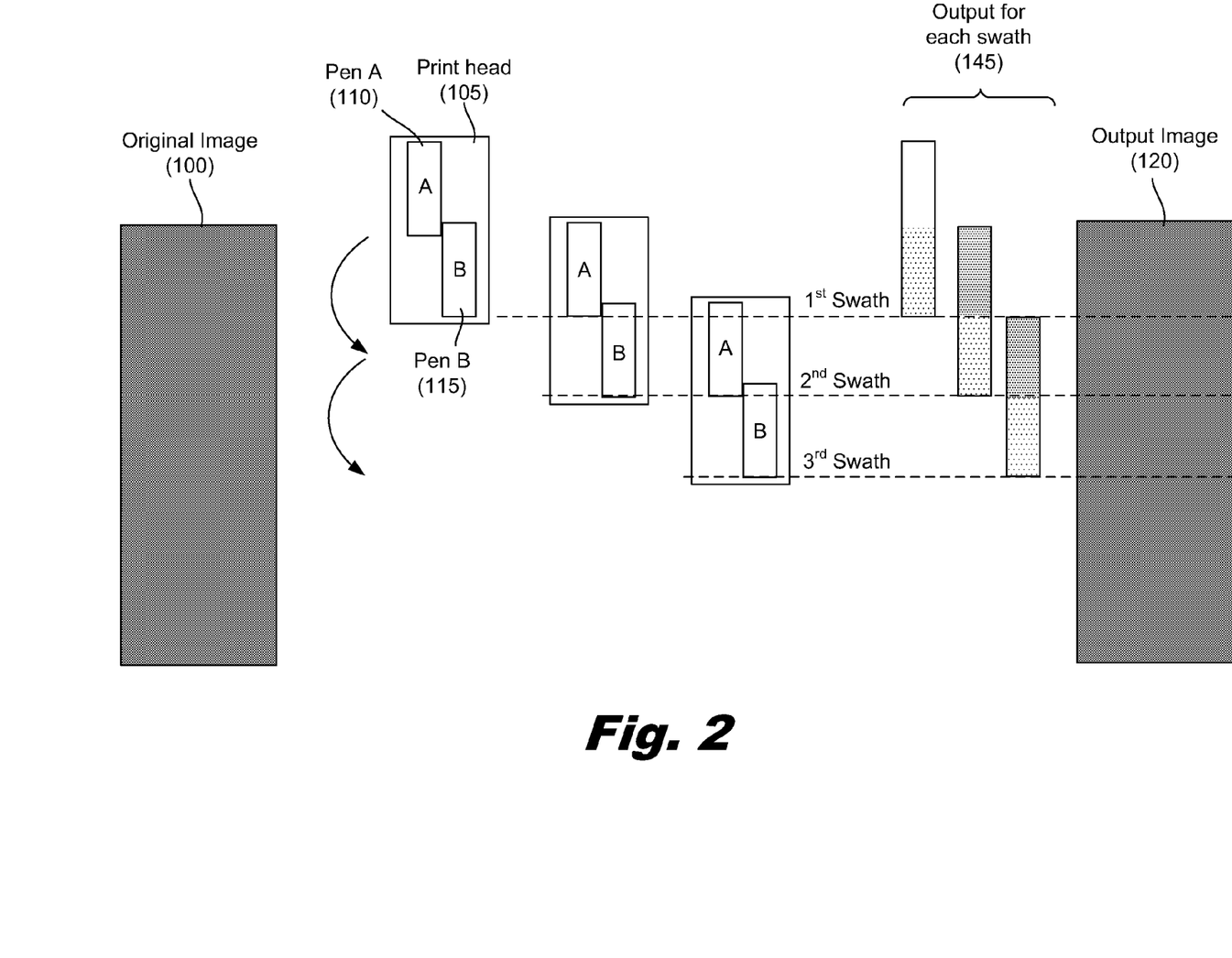
FIG. 2 is a diagram of a multipass printing method which increases the color uniformity of the output image, according to one embodiment of principles described herein.

FIG. 2 is a diagram of a multi-pass printing method which increases the method of color uniformity of the output image. This multi-pass printing method resolves the banding issue which was present in FIG. 1. However, the printhead (105) must pass over each portion of the substrate twice. Consequently, the image may take almost twice as long to produce. In this example, the original image (100) comprises a uniform field. The printhead (105) makes a first pass over the substrate and produces an output in which Pen B (115), which has a lighter drop weight, deposits a first band over the substrate. Pen A (110) is inactive and not used in the first swath. The printhead (105) is then moved down (or correspondingly the substrate is advanced) half the distance of the printhead and second swath is printed over the substrate. In the second swath, Pen A (110) deposits ink over the same area as was printed in the first swath by Pen B (115). Pen B (115) prints a portion of the substrate which has previously not been printed. This continues with the third swath where Pen A (110) prints over the band which was printed by Pen B (115) in the second swath and Pen B (115) prints over a new portion of the output image. Using this technique, each portion of the output image is printed using a combination of Pen A (110) and Pen B (115). Consequently, the variation between Pen A (110) and Pen B (115) is not a significant factor and the output image (120) has a uniform appearance. This resolves the image quality issue but reduces the printer's throughput by approximately half.

The manufacturing variability between thermal inkjet pens is approximately plus or minus 10% for drop weight. For example, if Pen A (110) has a drop weight of 10 nanograms per drop, it would be expected that Pen B (115) would have a drop weight between 9 nanograms and 11 nanograms. This variability can be caused by a number of factors including differences in dimensions in the firing chambers, nozzles, or heating elements between Pen A (110) and Pen B (115).

Figure 3:
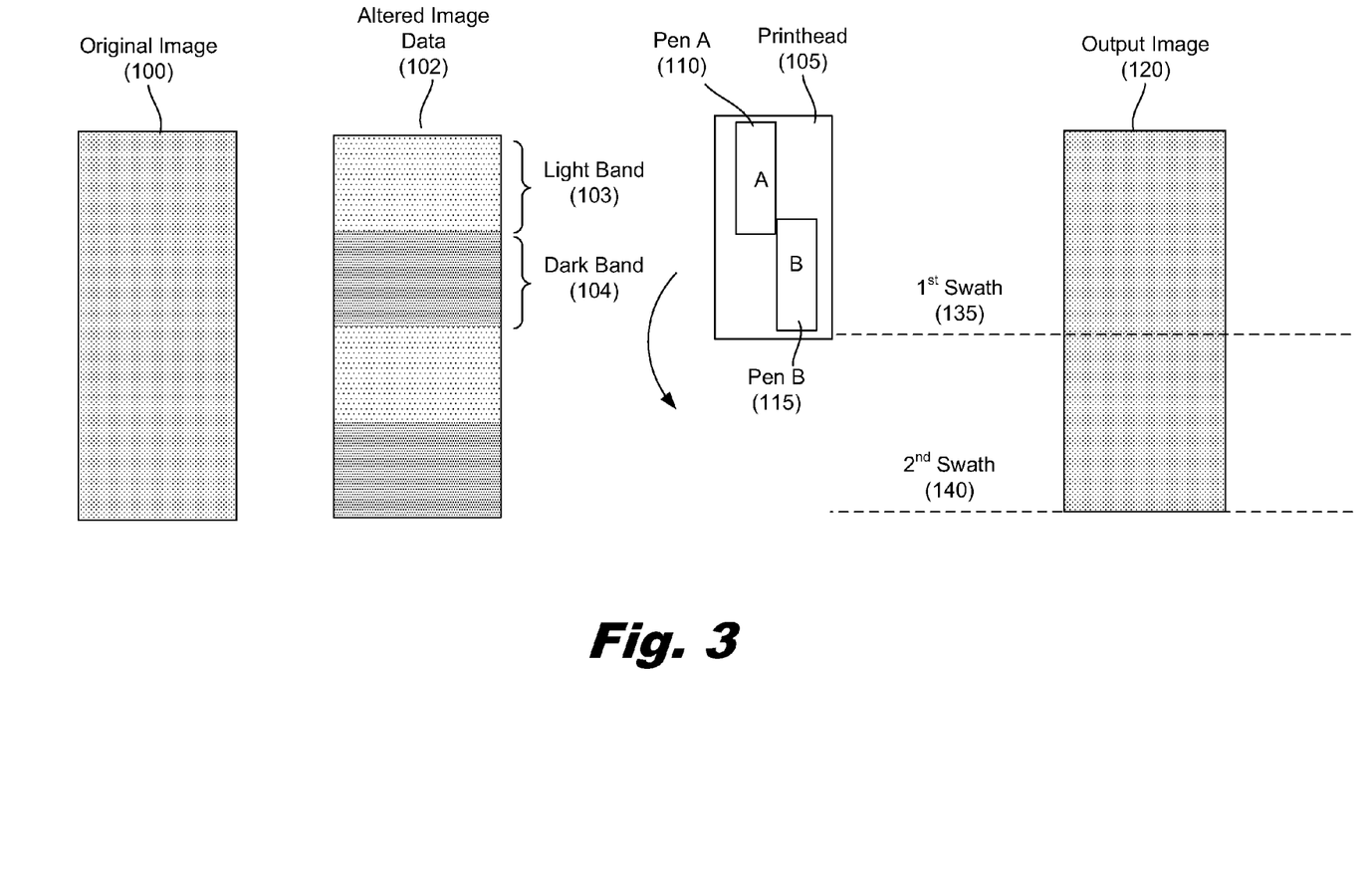
FIG. 3 is a diagram of a single pass printing method where the image data is altered to increase the color uniformity of the output image, according to one embodiment of principles described herein.

FIG. 3 is a diagram of a single-pass printing method where the image data is altered to increase the color uniformity of the output image. In this illustrative example the original image (100) is a uniform field. The performance difference in between the drop weight of Pen A (110) and Pen B (115) is calculated and the inverse of the differences applied to the original image (100) to produce altered image data (102). When the altered image data (102) is printed by the printhead (105), the light band (103) of the altered image data (102) is printed by Pen A (110). As discussed previously, Pen A has a higher drop weight than Pen B (115). Consequently, Pen A (110) prints the light band (103) slightly darker than Pen B (115) would have printed it. Similarly, Pen B (115) prints the dark band (104). Pen B (115) has a slightly smaller drop weight and consequently prints the dark band (104) slightly lighter than it is presented in the altered image data (102). The result is that the output image (120) has a uniform appearance which corresponds to the original image (110). By altering the original image prior to printing, the printer can use a single-pass method to generate the output image (120) without creating the banding issues described with respect to FIG. 1.

To accurately create the altered image data (102), the relative difference in the printing characteristics of Pen A (110) and Pen B (115) is found. One method of determining the differences between Pen A (110) and Pen B (115) is to print a series of calibration blocks using Pen A (110) and Pen B (115) and then optically compare these calibration blocks to determine the relative difference in the printing characteristics of Pen A (110) and Pen B (115).

Figure 4:
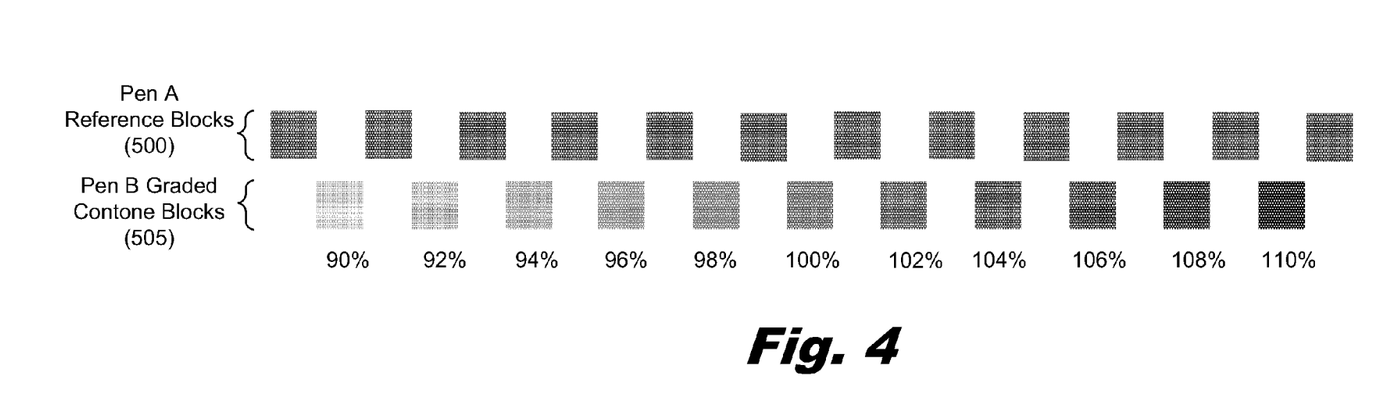
FIG. 4 is a diagram of illustrative printed calibration blocks, according to one embodiment of principles described herein.

FIG. 4 is a diagram of illustrative printed calibration blocks (500, 505). A top row of reference blocks (500) are printed with Pen A at a nominal optical density. In this example, the nominal optical density printed by Pen A is designated as 100% and are used as a reference for the graded contone blocks (505) printed using Pen B. These graded contone blocks (505) are generated when the contone values of a calibration image printed by Pen B are changed from the nominal optical density to through the range of normal manufacturing variability between pens.

According to one illustrative embodiment, the drop weight variability (and consequently the optical density) between nozzles is within a range of ±10% of the nominal optical density. For example, the graded contone blocks (505) may begin with a first block which has an optical image density of approximately 90% of a nominal setting. The next block may be printed with an optical density which is 92% of the nominal setting. The third block may be printed with an optical density that is 94% of the nominal setting and so forth until the final block is printed with a setting that is 110% of the nominal optical density. This produces the graded contone blocks (505) which span the typical manufacturing variation of plus or minus 10%. Consequently, it would be expected that at least one of the graded contone blocks (505) would closely match at least one of the reference blocks (500). For purposes of illustration, the differences in the optical density in the graded contone blocks (505) have been exaggerated. This provides a large degree of contrast between the reference blocks (500) and the graded contone blocks (505).

Figure 5:
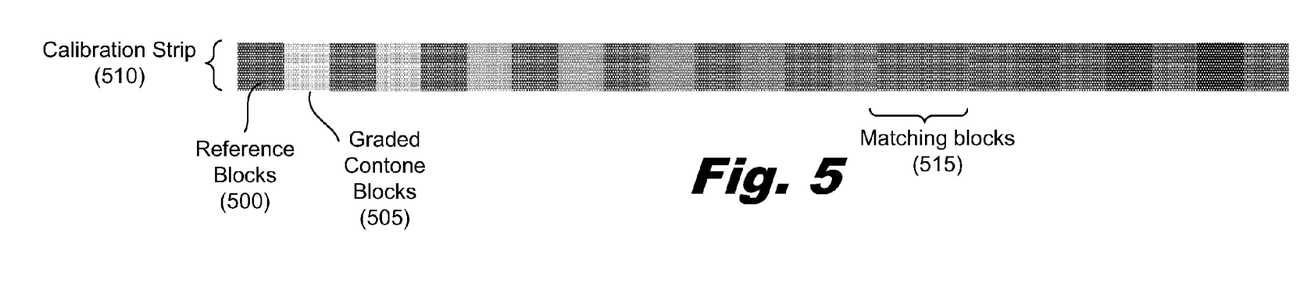
FIG. 5 is a diagram of an illustrative calibration strip formed by combining reference blocks printed by a first pen with graded contone blocks printed by a second pen, according to one embodiment of principles described herein.

FIG. 5 is a diagram of an illustrative calibration strip (510) formed by combining the reference blocks printed by Pen A with the graded contone blocks printed by Pen B. The calibration strip (510) includes alternating segments with every other segment being printed by Pen A using calibration data having a nominal contone value. The graded contone blocks (505) printed by Pen B are interspersed between the reference blocks (500) printed using Pen A. This results in a calibration strip (510) which combines the reference blocks (500) and the graded contone blocks (505). As can be seen in FIG. 5, the contrast between the lighter contone blocks (505) and the reference blocks (500) is fairly significant on the left hand side of the calibration strip (510). Moving to the right along the calibration strip (510), the contrast between the contone blocks (505) and the reference blocks (500) decreases until they are closely matched at a point to the right of the center of the calibration strip. These matching blocks (515) indicate contone values where Pen B prints with similar optical densities as Pen A using a nominal or reference contone value. On the right hand portion, the graded contone blocks (505) are darker than the reference blocks (500).

Figure 6:
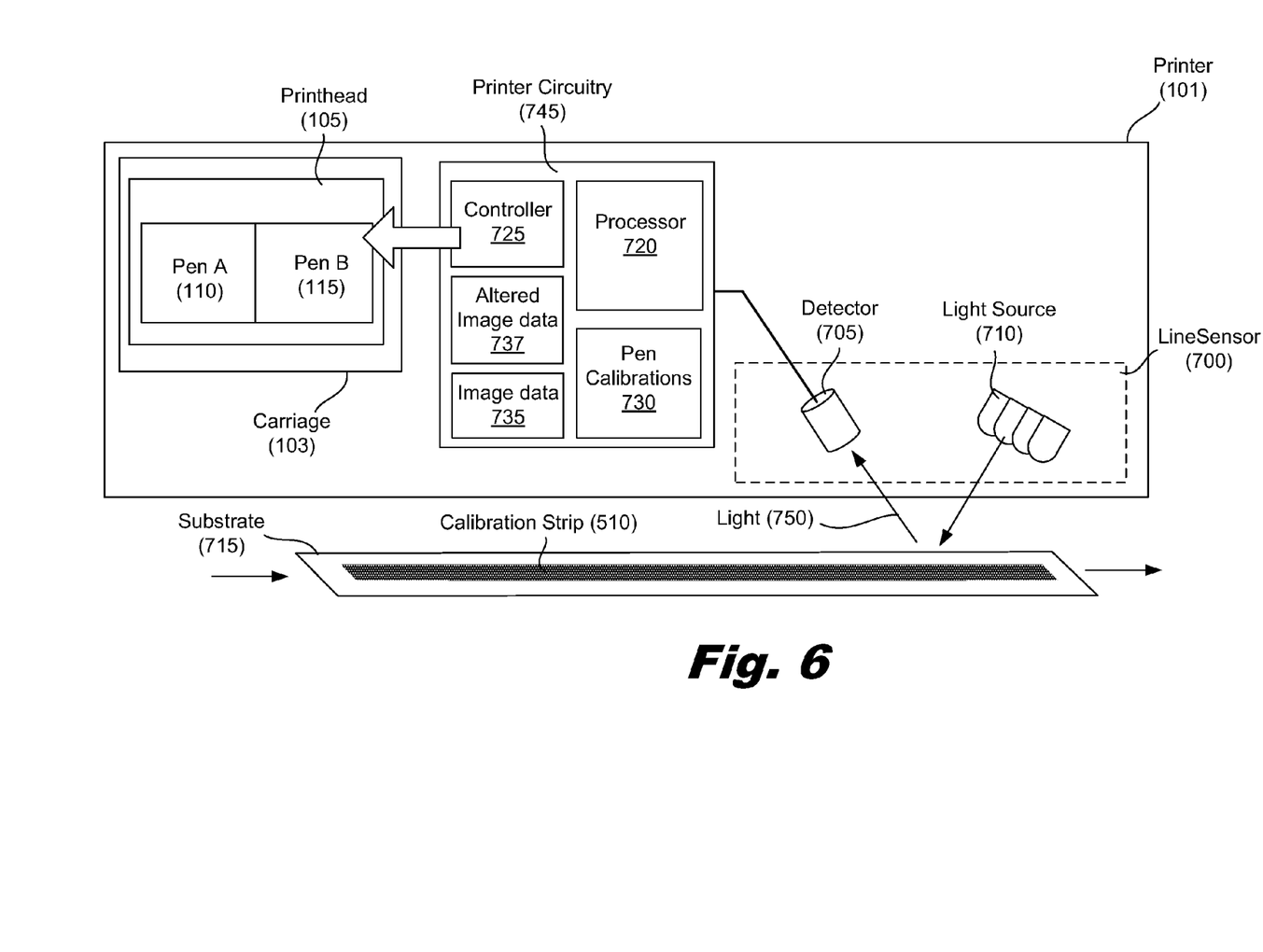
FIG. 6 is a diagram of an illustrative printing system for virtual pen calibration, according to one embodiment of principles described herein.

FIG. 6 shows an illustrative system for compensating for performance differences between multiple pens (110, 115)

contained in a printhead (105). The system includes a substrate (715) which has been printed by the printer (101) with a calibration strip (510). The calibration strip (510) was printed using the pens (110, 115) of printhead (105). According to one illustrative embodiment, the printhead (105) is moved over the substrate by a carriage (103). The line sensor (700) may also be moved over the substrate by the carriage (103). In other embodiments, the printhead (105) may be a page wide printhead which deposits ink on the substrate (715) as the substrate (715) is moved beneath the printhead (105).

According to one illustrative embodiment, a line sensor (700) includes multiple light sources (710) and a detector (705). The light sources (710) illuminate the calibration strip (510) and the detector (705) senses light which is reflected from the calibration strip (510). Lighter blocks in the calibration strip (510) reflect more light than darker blocks.

The line sensor (700) is scanned over the substrate (715) or the substrate (715) is moved with respect to the line sensor (700). This moves the line sensor (700) along the calibration strip (510) and produces a variation in the reflected light (750) which reaches the detector (705). The detector (705) converts this reflected light (750) into an electrical signal which is sent to the printer circuitry (745). The printer circuitry (745) includes a processor (720) which receives the electrical signals and converts them into digital data. The processor (720) then generates pen calibrations (730) which are applied to image data (735) which are applied to produce the altered image data (737). The altered image data (737) is used by the controller (725) to control the printhead (105). As described in FIG. 3, this altered image data (737) is used to print the original image on a substrate with Pen A (110) and Pen B (115) receiving different bands of the altered image. These altered bands compensate for the relative differences in the printing performance of Pen A (110) and Pen B (115).

Figure 7:
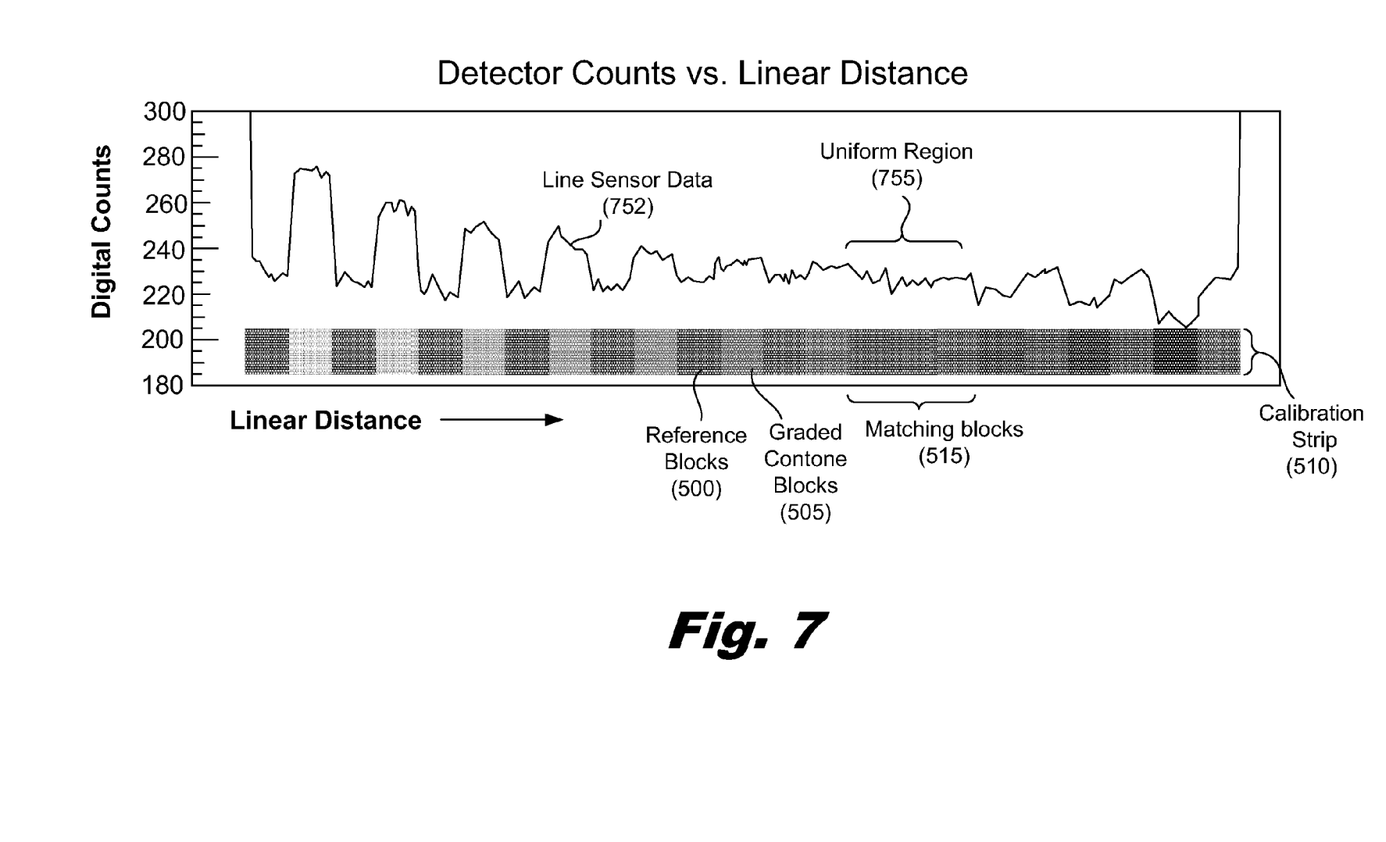
FIG. 7 is an illustrative graph of measurements of a calibration strip made by a line sensor, according to one embodiment of principles described herein.

FIG. 7 is an illustrative graph of measurements made from a calibration strip (510) by a line sensor (700, FIG. 6). The horizontal axis to the graph corresponds to linear distance along the calibration strip (510). The vertical axis of the graph corresponds to digital counts produced by the detector (705, FIG. 6). Lighter portions of the calibrations strip (510) reflect greater amounts of light. This larger amount of light produces a greater electrical signal at the detector (705, FIG. 6) and a correspondingly higher number of digital counts. For example, the reference block (500) to the far left of the calibration strip (510) has a significantly higher optical density than the graded contone block (505) adjacent to it. Consequently, the reference block (500) reflects a smaller amount of the incident light than the graded contone block (505) adjacent to it. This is reflected in the line sensor data (752) produced by the line sensor (700, FIG. 6).

Ideally, the reference blocks (500) will produce uniform signals across the entire length of the calibration strip (510). However, because of noise and other factors, the digital counts produced over the various reference blocks (500) can vary somewhat in the readings taken by the line sensor (700, FIG. 6) across the calibration strip (510). The graded contone blocks (505) exhibit differences in their optical density. The graded contone blocks (505) to the left have a lower optical density and a correspondingly greater reflectivity, while graded contone blocks (505) on the right have a higher optical density and a correspondingly lower reflectivity. Where the optical density of the graded contone blocks (505) match the reference blocks (500), a uniform region (755) is created. Within their uniform region (755) the optical densities are similar and, consequently, the digital counts of both the graded contone blocks (505) and the reference blocks (500) are similar. The uniform region (755) corresponds to graded contone blocks (505) which were printed by Pen B using data which had contone values which were slightly above the nominal contone value used to print the reference blocks (500) by Pen A, but produce the same optical density.

Figure 8:
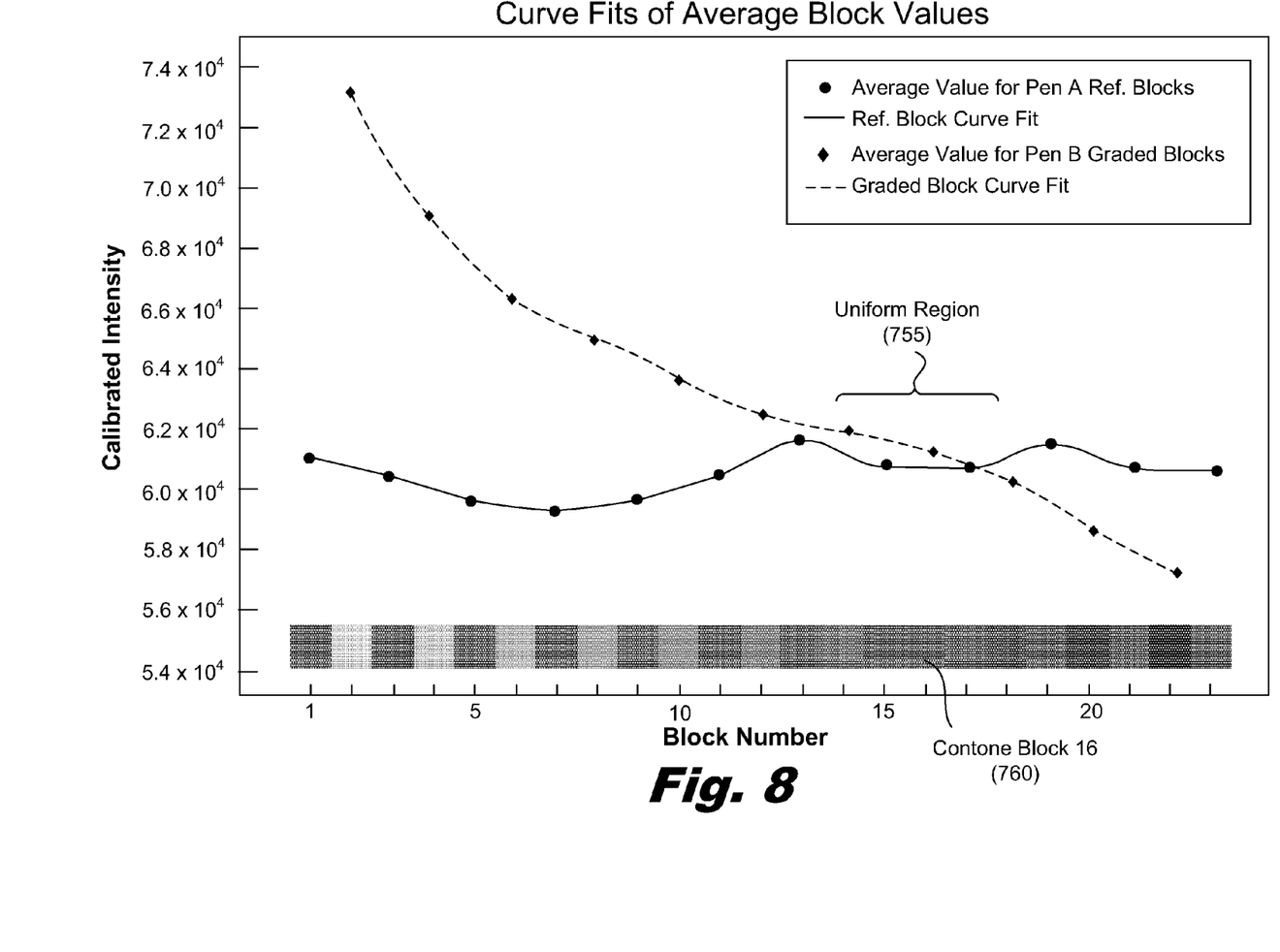
FIG. 8 is an illustrative graph of curve fits of line sensor data, according to one embodiment of principles described herein.

FIG. 8 is an illustrative graph of curve fits of the line sensor data (752, FIG. 7). The horizontal axis of the graph corresponds to block numbers in the calibration strip (510). The vertical axis of the graph corresponds to calibrated light intensity sensed by the detector (705, FIG. 6). To reduce the impact of noise on the curve fits, an average value has been computed for each of the blocks in the calibration strip. The average value for the Pen A reference blocks is shown in FIG. 8 as solid round circles and the average value for the "Pen B" graded contone blocks is shown as solid diamonds. The curve fit for the average values of the reference blocks is shown as a solid line and the curve fit for the graded blocks is shown as a dashed line. Within the uniform region (755) the two curve fits intersect. The intersection of the two curve fits corresponds to a contone value for Pen B which can be used to produce the same optical density as the reference blocks printed by Pen A. For example, the reference blocks printed by Pen A in the uniform region were printed with a contone value of 100% while the matching contone block 16 (760) was printed with a contone value which is 104%. This difference in contone values compensates for the difference in drop weight between Pen A and Pen B.

Figure 9:
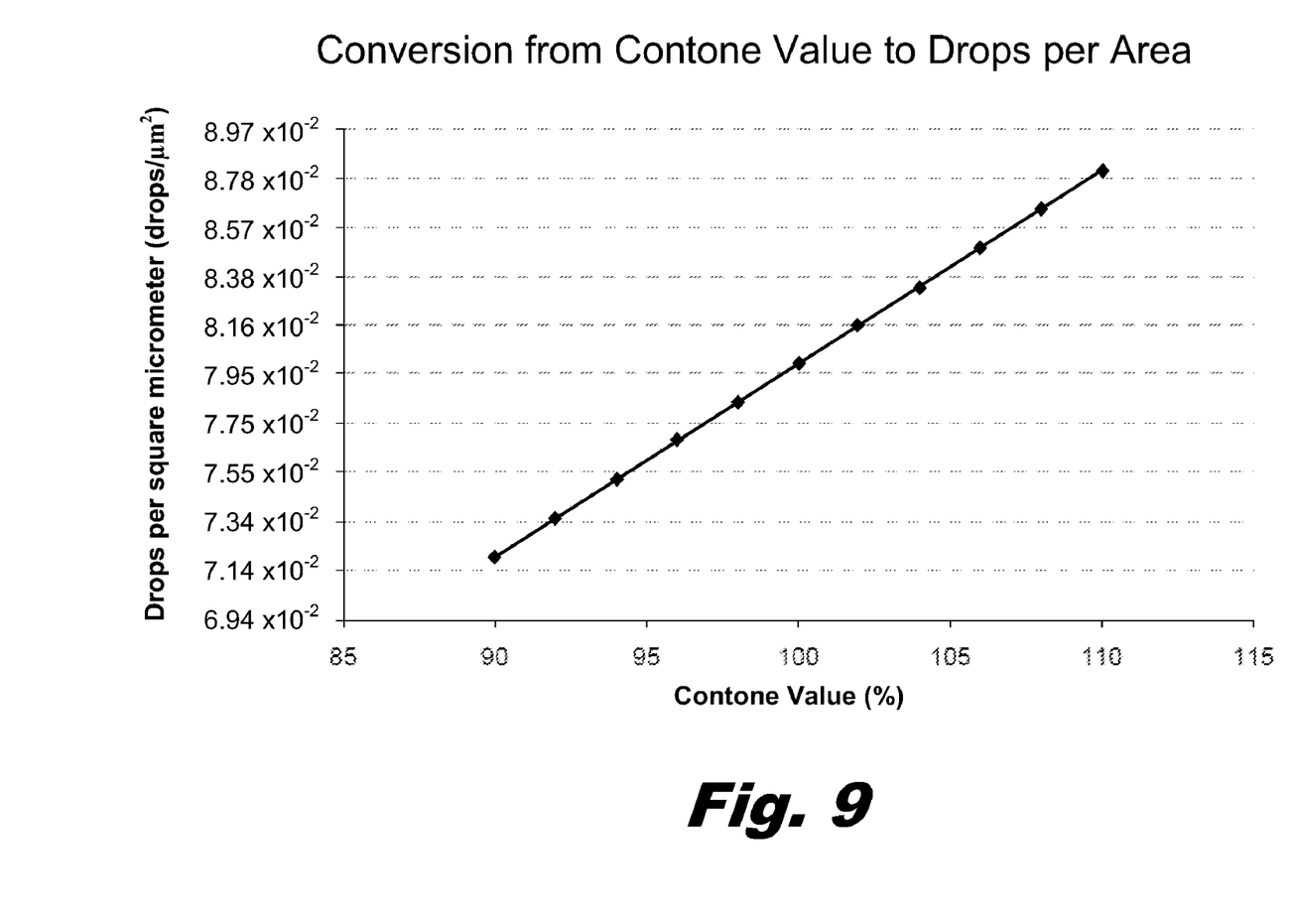
FIG. 9 is an illustrative graph which converts contone values to drops per area, according to one embodiment of principles described herein.

FIG. 9 shows the conversion from the contone value to drops per area. In this illustrative environment, the percent of the contone value is shown along the horizontal axis of the graph and the drops per square micrometer are shown along the vertical axis of the graph. FIG. 9 allows the difference in contone values used to produce matching optical densities by Pen A and Pen B to be translated into a difference in drops per square micrometer. This information is used to create calibration curves to alter the original image and produce the altered image data.

Using this chart, it can be determined that the printer has to fire XX drops/$\mu m^2$ cell in Pen A areas and YY drops/$\mu m^2$ cell in Pen B areas to reproduce the image. The amount of ink deposited by the pens will be equal if:

XX drops*Pen$ADW$=YY drops*Pen$BDW$=ink amount (drops/$\mu m^2$ cell)

Where:
XX=number of drops deposited by Pen A in a 1 $\mu m^2$ cell
YY=number of drops deposited by Pen B in a 1 $\mu m^2$ cell
PenADW=drop weight of droplets ejected by Pen A
PenBDW=drop weight of droplets ejected by Pen B By using the nominal contone value of the image printed by Pen A as a reference, it can be shown that:

$$PenBDW = \frac{XX \text{ drops}}{YY \text{ drops}} * PenADW = DWratio * PenADW$$

Where:
DWratio=the drop weight ratio between the two pens, which represents the performance difference between the two pens.

In the example discussed above, Pen A prints a reference image using data which as a nominal contone value and Pen B is determined to an image with the same optical density using data with a contone value of 104%. Using the chart shown in FIG. 9, it can be shown that Pen A is printing approximately $8.00 \times 10^{-2}$ drops per $\mu m^2$ cell and Pen B is printing approximately $8.30 \times 10^{-2}$ drops per $\mu m^2$ cell to produce the same optical densities. Consequently, the drop weight ratio is about 0.96. This drop weight ratio can be applied to the image data which is to be printed to compensate for the performance difference between the two pens. For example, bands which are to be printed by Pen B could darkened so that Pen B deposits the same amount of ink as Pen A when both pens are operating at nominal settings. Additionally or alternatively, bands which are to be printed by Pen A could be lightened to achieve the same effect.

Figure 10A:
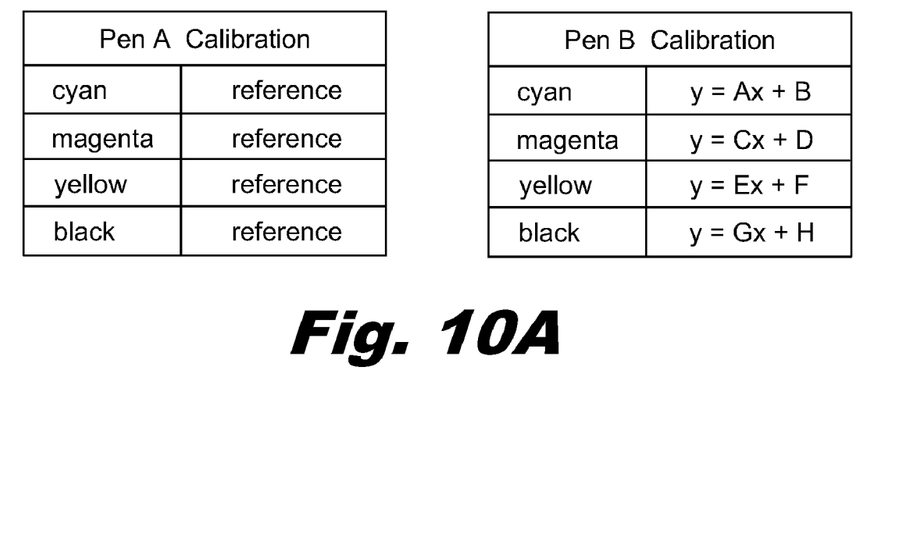
FIGS. 10A and 10B are illustrative charts of pen calibrations for colors dispensed by an ink jet printhead with staggered pens, according to one embodiment of principles described herein.

FIG. 10A shows a chart which has illustrative calibration curves for Pen B. The drop weight produced by a given pen is dependant on a number of factors, including the type of ink being dispensed by a given inkjet nozzle, the color of the ink being dispensed, the type of media being used and many other factors. By using a calibration strip printed with the same ink and on the same type of substrate which will be used when printing, many of these factors can be automatically compensated for and captured in a calibration curve. Because the pens dispense a variety of inks to create full color images, calibration strips are created for each of the colors separately. In the example shown in 10A, the pens use a cyan/magenta/yellow color scheme with an additional black ink. Pen A is used to create the reference blocks in the calibration strip and Pen B is used to create the graded contone blocks. Consequently, the nominal performance of Pen A is used as a reference and Pen B is calibrated against the performance of Pen A.

FIG. 10A shows that the calibration curves generated for Pen B are linear. The calibrated value, Y, is equal to a constant times X plus an offset constant. A linear calibration curve is created for each of the colors dispensed by Pen B. As shown in the chart, the constants for each of the colors—magenta, cyan, yellow and black—may be different. This corresponds to the different performance of the thermal ink jet printhead for the various inks. The Pen B calibration curves are applied over the various images to be printed by the printer. For each of the images which are to be printed, the bands which will be printed by Pen B are altered according to the calibration curve shown in FIG. 10A. This produces the altered image data which is then fed to Pen A and Pen B. The altered image data compensates for the differences in performance between Pen A and Pen B. This results in an image which does not have substantial banding artifacts. According to one illustrative embodiment, the calibration procedure need not be performed for each image or substrate type. In some embodiments, the calibration is performed once and is valid until the physical characteristics of the printing system change.

Figure 10B:
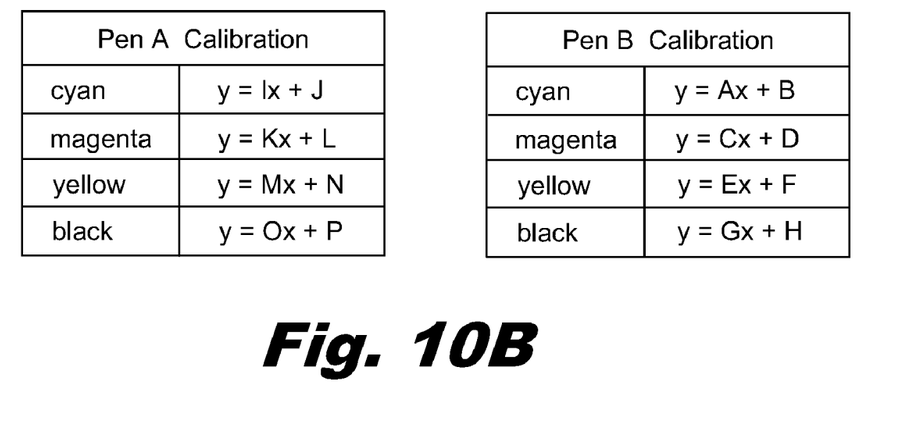

However, the calibration shown in FIG. 10A only addresses the relative differences between Pen A and Pen B and does not address the absolute accuracy of Pen A and Pen B in reproducing the color of the original image. To accurately reproduce the color of the original image across multiple printers and multiple images, it can be desirable to calibrate both Pen A and Pen B. As shown in FIG. 10B, calibrations have been applied to both Pen A and Pen B. According to one illustrative embodiment, the image data feed Pen A may be adjusted to accurately reproduce the colors of the original image and image data fed to Pen B can be calibrated relative to Pen A to match Pen A's performance to reduce banding artifacts in the image. By calibrating both pens, the images produced will have both improved uniformity between portions of the image printed by the first and second pens and improved color accuracy between images produced on different printers.

In this case, linear calibrations are given for each color dispensed by Pen A and each color dispensed by Pen B. The linear calibration curves shown in FIGS. 10A and 10B are only one illustrative example. A variety of other curve fits could be used, including polynomial curve fits, quadratic curve fits or other curve fits.

Figure 11:
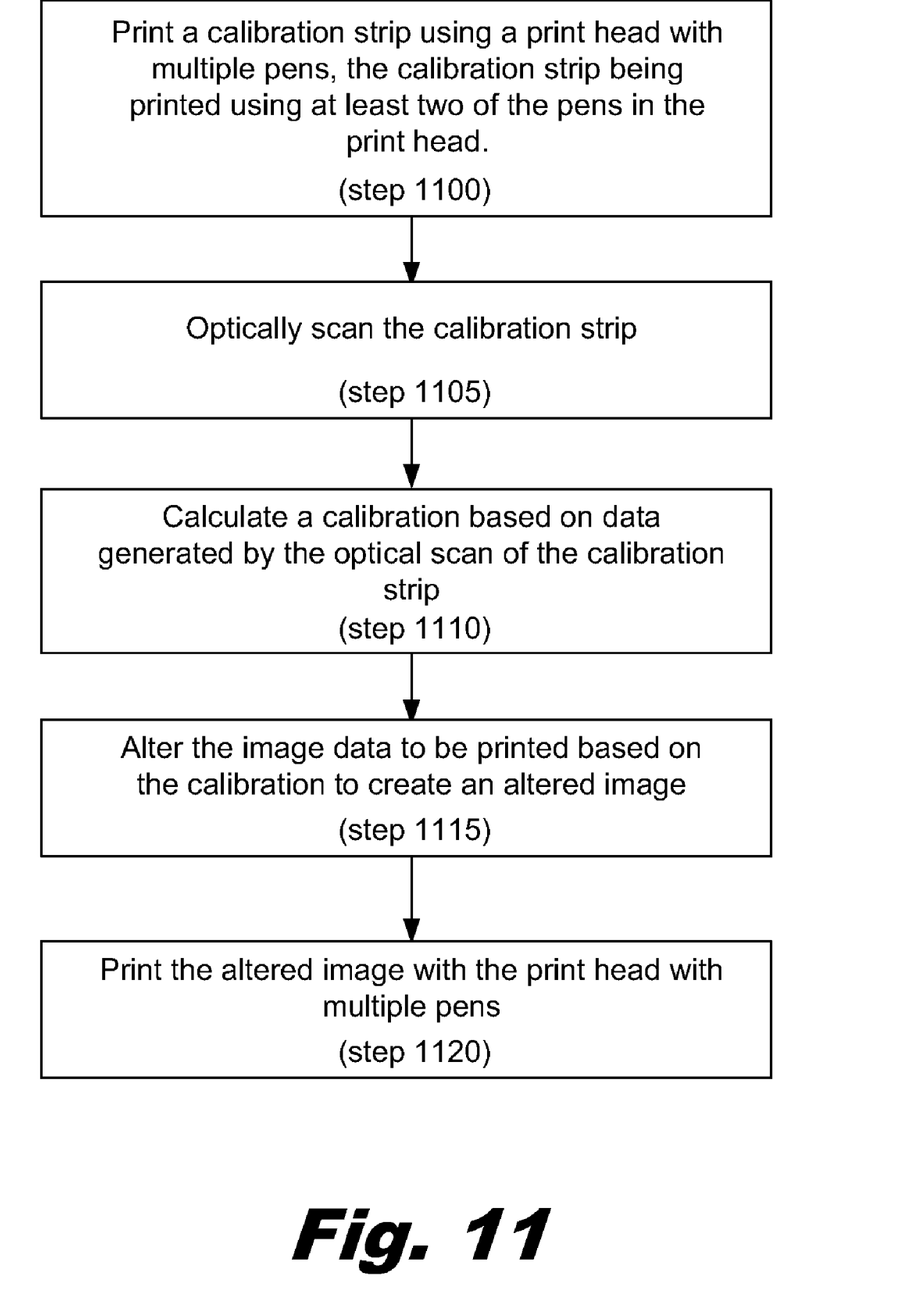
FIG. 11 is a flowchart of an illustrative method for virtual pen calibration according to one embodiment of principles described herein.

FIG. 11 is a flowchart of an illustrative method for virtual pen calibration. In general the method comprises altering an image prior to printing based on a difference in printing performance of a first pen and a second pen to produce altered image data. The altered image data compensates for the performance difference between the first pen and second pen. A printhead which contains the first pen and the second pen is then used to print the altered image data. This method improves image uniformity in one pass printing by the printhead.

According to one illustrative embodiment, the method includes printing a calibration strip using a printer with multiple pens (step 1100). The calibration strip is printed using at least two of the pens in the printer and is made of a first segment printed by the first pen and a second segment printed by the second pen. In some embodiments, the calibrations strip includes alternating segments, with every other segment being an image printed by the first pen using calibration data having a first contone value. The intervening segments being images printed by the second pen using a set of calibration data having incremented contone values. According to one embodiment, the first contone value is set at nominal optical density and the incremented contone values are varied through the normal range manufacturing variation in optical printing densities between inkjet pens. For example, the contone values may be varied from +/−10% of a nominal optical density. Although contone values are used as an illustrative example, a variety of other image parameters or pen performance parameters could be measured.

The calibration strip is optically scanned (step 1105). This scanning may occur in a variety of ways, including those discussed above. For example, the scanning may be done using an optical densitometer which includes one or more optical sources and one or more detectors. The optical sources generate light which incident on the printed substrate. The optical sources may be a plurality of light emitting diodes. The light emitting diodes are selectively activated to illuminate the calibration strip based on the color of the calibration strip. The light reflects off the printed substrate and is received by the detector(s).

A calibration between the pens is calculated using a difference in optical characteristics of the segments which make up the calibration strip as captured in the data generated by the optical scan of the calibration strip (step 1110). For example, the differences in optical densities between segments of the calibration strip can be measured. In some embodiments, calculating a difference in optical densities of the segments includes finding an average optical density value for each segment. A first curve fit is then generated which passes through the average optical density values for each segment printed by the first pen. Similarly, a second curve fit is generated which passes through the average optical density values for each segment printed by the second pen. An intersection between the first curve fit and the second curve fit is determined. According to one illustrative embodiment, the intersection point is calculated by applying a mathematical algorithm to the first curve fit and the second curve fit to find a compensation value which can be applied to the second pen to produce a printed optical density which is substantially similar to the optical density of the first pen when the first pen is printing at a nominal optical density.

The image data which is to be printed is altered based on the calibration to produce an altered image (step 1115). For example, the image data may be altered based on the difference in optical densities in the calibration strip. Altering the image data may include changing optical density of bands of the image according to which of the first pen and the second pen will print a given band.

The altered image is printed with the printhead which has multiple pens including the first pen and second pen (step 1120). As discussed above, one pass printing is typically used to print the altered image data.

For printheads which print in multiple colors the steps of printing the calibration strip; optically scanning the calibration strip; and calculating a difference in optical densities are repeated for each color of ink dispensed by the printhead. In some embodiments, calibration curves for each color are generated only for the second pen and only portions of the image which will be printed by the second pen are altered. In other embodiments, calibration curves for each color are generated for both the first pen and the second pen. The calibration curves for the first pen are applied to portions of the image data which will be printed by the first pen and calibration curves for the second pen being applied to portions of the image data which will be printed by the second pen. Where calibration curves for both the first and second pen are created, the calibration curves can improve uniformity between portions of the image printed by the first and second pens and also improve color accuracy between images produced on different printers.

In conclusion, the specification and figures describe a method for calibration of a virtual pen which results in reduced banding in one pass printing by a printhead with multiple pens. The calibration procedure includes printing a calibration strip with two or more of the pens, then scanning the calibration strip to measure differences in the printing performance of the pens. This information is then used to alter the original image prior to printing. The altered data compensates for the differences in the printing performance between the two pens and results in a reproduction of the original image with minimized banding. This method allows for one pass printing by the printhead with multiple pens while reducing or eliminating undesirable banding artifacts. The method maintains the image quality while improving the printing throughput of the printer.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method for virtual pen calibration comprising:
    altering an image prior to printing based on a difference in printing performance of a first pen and a second pen to produce altered image data, the first pen and the second pen being disposed in the same printer; and
    printing the altered image data with the printer.

2. The method of claim 1, further comprising:
    printing a calibration strip comprising a first segment printed by the first pen and a second segment printed by the second pen;
    optically scanning the calibration strip; and
    calculating a difference in optical densities of the first segment and the second segment;
    in which alterations to the image are based on the difference in optical densities of the first segment and second segment.

3. The method of claim 2, in which the calibration strip comprises alternating segments, with every other segment being a image printed by the first pen using calibration data having a first contone value; in which intervening segments are images printed by the second pen using a set of calibration data having incremented contone values.

4. The method of claim 3, in which the first contone value comprises a nominal optical density; in which the incremented contone values are varied through the normal range manufacturing variation in optical printing densities between inkjet pens.

5. The method of claim 2, in which optically scanning the calibration strip comprises illuminating the calibration strip with an optical source and detecting the amount of reflected light.

6. The method of claim 5, in which the optical source comprises a plurality of light emitting diodes, the light emitting diodes being selectively activated to illuminate the calibration strip based on the color of the calibration strip.

7. The method of claim 2, in which calculating a difference in optical densities of the first segment and the second segment comprises finding an average optical density value for each segment.

8. The method of claim 7, further comprising generating a first curve fit through the average optical density values for each segment printed by the first pen and a second curve fit through the average optical density values for each segment printed by the second pen.

9. The method of claim 8, further comprising determining an intersection between the first curve fit and the second curve fit.

10. The method of claim 9, further comprising applying a mathematical algorithm to the first curve fit and the second curve fit to find a compensation value which can be applied to the second pen to produce a printed optical density which is substantially similar to the optical density of the first pen when the first pen is printing at a nominal optical density.

11. The method of claim 2, in which altering the image data to be printed is based on the difference in optical densities of the first segment and the second segment to create a altered image data, and altering the optical densities of bands of the image data according to which of the first pen and the second pen will print a given band.

12. The method of claim 11, in which printing the altered image data comprises one pass printing.

13. The method of claim 2, further comprising repeating the printing of the calibration strip, optically scanning the calibration strip, and calculating a difference in optical densities for each color of ink dispensed by the first and second pens.

14. The method of claim 13, further comprising generating a calibration curve for each color dispensed by the first and second pens.

15. The method of claim 14, in which calibration curves for each color are generated only for the second pen, the calibration curves being applied only to portions of the image data which will be printed by the second pen.

16. The method of claim 14, further comprising:
    creating calibration curves for the first pen which improve the color accuracy of the first pen in printing an image; and
    creating calibration curves for the second pen which compensate for performance differences between the first pen and second pen.

17. The method of claim 16, in which the calibration curves produce both:
    improved uniformity between portions of the image printed by the first and second pens; and
    improved color accuracy between images produced on different printers.

18. A method for improving image uniformity in one pass printing by a printhead with multiple pens comprises:

altering the image data which is to be printed to compensate for performance differences between a first pen and a second pen in the printhead; and     printing the altered image data with one pass of the printhead.

19. The method of claim 18, further comprising:

creating a calibration for the second pen based on the relative performance differences between the first pen and the second pen, in which creating calibration for the second pen comprises:

measuring the relative performance differences between the first pen and second pen by using the first pen to print at least one baseline image and the second pen to print a series of incrementally changing images, the incrementally changing images being produced by varying a image parameter of interest;

comparing the incrementally changing images to the at least one baseline image to determine which incrementally changing images most closely match the at least one baseline image;

basing the calibration of the second pen on the value of the image parameter of the incrementally changing images which most closely matched the at least one baseline image; and     applying the calibration for the second pen to portions of the image data which will be printed by the second pen.

20. A system for pen drop weight calibration comprises:

a carriage comprising a first pen and a second pen;

a calibration strip, the calibration strip comprising a first portion printed by the first pen and a second portion printed by the second pen;

a line sensor, the line sensor comprising a light source and a detector, the line sensor for illuminating the calibration strip with the light source and measuring the reflection from the first portion and second portion of the calibration strip with the detector;

processor which receives the output of the detector, generates a pen calibration based on the output of the detector, and alters image data which is to be printed; and     a controller which sends the altered image data to the printhead, the printhead dispensing ink to create an image based on the altered image data.

\* \* \* \* \*